United States Patent
Supancic, III

(10) Patent No.: US 11,568,621 B2
(45) Date of Patent: Jan. 31, 2023

(54) DYNAMIC CHARACTER MODEL FITTING OF THREE-DIMENSIONAL DIGITAL ITEMS

(71) Applicant: Blizzard Entertainment, Inc., Irvine, CA (US)

(72) Inventor: James Steven Supancic, III, Irvine, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 30 days.

(21) Appl. No.: 17/160,182

(22) Filed: Jan. 27, 2021

(65) Prior Publication Data

US 2022/0207843 A1 Jun. 30, 2022

Related U.S. Application Data

(60) Provisional application No. 63/132,742, filed on Dec. 31, 2020.

(51) Int. Cl.
*G06T 19/20* (2011.01)
*G06T 15/04* (2011.01)
(Continued)

(52) U.S. Cl.
CPC ............. *G06T 19/20* (2013.01); *G06N 20/00* (2019.01); *G06T 15/04* (2013.01); *G06T 15/10* (2013.01); *G06T 17/20* (2013.01)

(58) Field of Classification Search
None
See application file for complete search history.

(56) References Cited

U.S. PATENT DOCUMENTS 8,370,360 B2 * 2/2013 Mo .................. G06Q 10/04
707/738
10,310,616 B2 * 6/2019 Rose .................. G06F 3/0304
(Continued)

OTHER PUBLICATIONS

Bhatnagar, Bharat Lal, et al. "Multi-garment net: Learning to dress 3d people from images." Proceedings of the IEEE/CVF international conference on computer vision. 2019.*

*Primary Examiner* — Sultana M Zalalee
(74) *Attorney, Agent, or Firm* — Hickman Becker Bingham Ledesma LLP

(57) ABSTRACT

Systems and methods for modifying three-dimensional digital items to fit different character models are described herein. In an embodiment a machine learning system is configured to compute a shape and size of three-dimensional digital objects to fit a second character model based on the shape and size that the same three-dimensional digital objects have to fit a first character model. A server computer receives particular input data defining a plurality of particular input vertices for a particular input three-dimensional digital object fit for the first character model. In response to receiving the particular input data, the server computer computes, using the machine learning system, particular output data defining a plurality of particular output vertices for a particular output three-dimensional digital object, the particular output three-dimensional digital object comprising the particular input three-dimensional digital object fit for the second character model. The server computer then causes displaying, on the client computing device, of the particular output three-dimensional digital object combined with the second character model.

18 Claims, 5 Drawing Sheets

(51) Int. Cl.
*G06N 20/00* (2019.01)
*G06T 17/20* (2006.01)
*G06T 15/10* (2011.01)

(56) References Cited

U.S. PATENT DOCUMENTS

| | | | |
|---|---|---|---|
| 10,679,046 B1* | 6/2020 | Black | G06N 3/0454 |
| 11,010,961 B2* | 5/2021 | Stachniak | G06N 20/00 |
| 2011/0298897 A1* | 12/2011 | Sareen | G06Q 30/06 |
| | | | 348/47 |
| 2017/0080346 A1* | 3/2017 | Abbas | A63F 13/79 |
| 2018/0246907 A1* | 8/2018 | Thiel | G01C 21/32 |
| 2018/0374231 A1* | 12/2018 | Znamenskiy | G06T 7/50 |
| 2019/0325653 A1* | 10/2019 | Yip | G06F 3/04883 |
| 2019/0371080 A1* | 12/2019 | Sminchisescu | G06T 13/40 |
| 2020/0013233 A1* | 1/2020 | Kwai | G06T 17/20 |
| 2020/0027155 A1* | 1/2020 | Frakes | G06Q 30/06 |
| 2020/0111447 A1* | 4/2020 | Yaacob | G06V 20/00 |
| 2020/0151807 A1* | 5/2020 | Zhou | G06V 10/267 |
| 2021/0118239 A1* | 4/2021 | Santesteban | G06N 3/08 |
| 2021/0241531 A1* | 8/2021 | Lee | G06V 40/10 |
| 2021/0291046 A1* | 9/2021 | Bansal | A63F 13/35 |
| 2022/0157020 A1* | 5/2022 | Kang | G06T 17/20 |

* cited by examiner

DYNAMIC CHARACTER MODEL FITTING OF THREE-DIMENSIONAL DIGITAL ITEMS

BENEFIT CLAIM

This application claims the benefit under 35 U.S.C. § 119 of Provisional Application No. 63/132,742, filed Dec. 31, 2020, the entire contents of which are incorporated by reference as if fully set forth herein.

FIELD OF THE INVENTION

The present disclosure relates to three-dimensional digital animation. Specifically, the present disclosure relates to machine learning systems used to change a shape of a three-dimensional digital item to fit one or more character models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video games, animated movies, and other media rely on a large amount of digital modeling. While each frame could be generated as a still image, doing so at any scale would be extremely inefficient and, in many cases, completely untenable. Instead, animators tend to create digital models of characters and digital models of different items that a character might wear. For instance, a lab coat may be modeled separate from a character and then set on the character at a later stage in the animation process.

As a media project becomes larger, the number of items to model becomes larger. This problem of scope is exacerbated when it comes to interactive media, such as video games, where individual items may need to be modeled multiple times to fit different characters. For example, in Blizzard's World of Warcraft, over a thousand helmets have been modeled to fit twenty eight unique character models, ranging from male humans to female panda-like creatures called pandaren. With twenty eight versions of a thousand helmets, World of Warcraft sports twenty eight thousand unique helmets.

With larger scope projects, every addition to the project takes on an increasing level of scale. For instance, each new helmet added to World of Warcraft has to be modeled twenty eight times while each new character model added may require a thousand existing helmets to need to be adjusted to fit the new character model. The increasing technical cost of adding character models and helmets can increase the amount of time it takes to update a project and can have a chilling effect on creativity. Designers are discouraged from creating new character models with radically different features, as any new character model with radically different features will be more difficult to fit into existing helmets than a character model that is similar to an existing character model.

Thus, there is a need for a system which can leverage existing data to fit new digital items to existing character models or fit existing digital items to new character models. Additionally, creating such a system often requires a set of ground truth data and digital modeling can be extremely subjective with different artists fitting digital items differently to a same character model. Thus, there is a need for a system which can leverage the existing data while taking into account different styles or levels of skill that were used to create fits of existing digital items.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

GENERAL OVERVIEW

Systems and methods for modifying three-dimensional digital items to fit different character models are described herein. According to an embodiment, a system stores data defining a plurality of different three-dimensional digital items, such as helmets, fit to a plurality of character models, such as character models corresponding to different genders and fictional races. The system matches vertices of the different model-specific three-dimensional digital items when fit to a first character model with vertices of the different model-specific three-dimensional digital items when fit to a second character model and generates a training dataset with one set of model-specific vertices acting as inputs and the other set of model-specific vertices acting as outputs. The system then trains a machine learning system using the training dataset. When the system receives data defining a new three-dimensional digital item fit to the first character model, the system computes output vertices using the trained machine learning system to generate a version of the new three-dimensional digital item fit to the second character model.

In an embodiment, a method comprises storing, at a server computer, a machine learning system configured to compute a shape and size of three-dimensional digital objects to fit a second character model based on the shape and size that the same three-dimensional digital objects have to fit a first character model; receiving, from a client computing device, particular input data defining a plurality of particular input vertices for a particular input three-dimensional digital object fit for the first character model; in response to receiving the particular input data, computing, using the machine learning system, particular output data defining a plurality of particular output vertices for a particular output three-dimensional digital object; wherein the particular output three-dimensional digital object is the particular input three-dimensional digital object fit for the second character model; and causing display, on the client computing device, of the particular output three-dimensional digital object combined with the second character model.

Structural Overview

Figure 1:
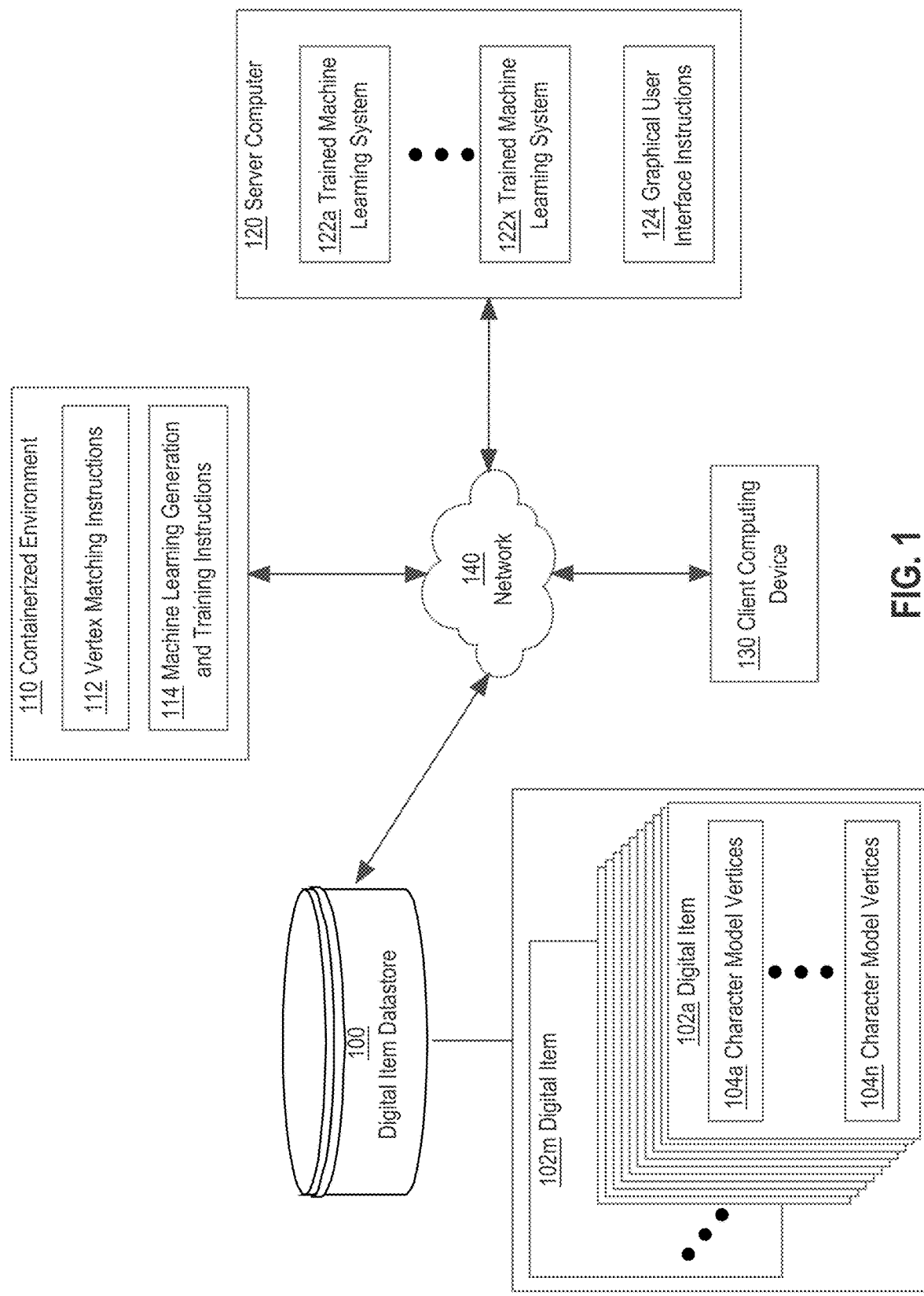
FIG. 1 depicts an example system for modifying three-dimensional digital objects to fit different character models.

FIG. 1 depicts an example system for modifying three-dimensional digital objects to fit different character models.

Digital item data store 100, containerized environment 110, server computer 120, and client computing device 130 are communicatively coupled over network 140. Network 140 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The digital item data store 100, containerized environment 110, server computer 120, client computing device 130, and other elements of the system each comprise an interface compatible with the network 140 and are programmed or configured to use standardized protocols for communication across the networks such as TCP/IP, Bluetooth, CAN protocol and higher-layer protocols such as HTTP, TLS, and the like.

Digital item data store 100 comprises a storage medium configured to store data relating to a plurality of digital items. Digital item data store 100 may comprise a database. As used herein, the term "database" may refer to either a body of data stored in a repository, the repository itself (e.g. a relational database management system (RDBMS)), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, digital item data store 100 stores digital items 102a-102m. Each of digital items 102a-102m comprise data defining three-dimensional model-specific digital items. As an example, digital items 102a-102m may comprise three-dimensional cosmetic items designed to be fit to character models for three-dimensional rendering. The digital items 102a-102m may be defined based on a size and shape of the digital items, such as through vertices on a three-dimensional mesh. The digital items 102a-102m may be further defined with other information, such as data defining textures, colors, physical properties such as material, moveability, or environmental interactions, lighting, and/or any other characteristics.

Each of the digital items 102a-102m may be fit to a plurality of character models. For example, a particular spiked helmet may have a different representation when fit to a human character model than when fit to a pandaren character model. In an embodiment, each digital item of digital items 102a-102m includes character model vertices 104a-104n. Each of character model vertices 104a-104n of a digital item 102a comprise data defining vertices for a model-specific version of the digital item 102a (i.e. the digital item 102a when fit to a particular character model). For example, character model vertices 104a may comprise vertices for the particular spiked helmet when fit to a male human character model, while character model vertices 104n may comprise vertices for the particular spiked helmet when fit to a female pandaren character model. The vertices may be defined by coordinates in three-dimensional space and/or by the vertices to which they connect.

Digital item data store 100 thus stores (m) digital items fit to (n) different character models. Thus, digital item data store 100 stores vertices for m*n model-specific three-dimensional digital objects. For instance, if digital item data store 100 stores data for 500 different helmets fit to 20 character models, digital item data store 100 may store data defining vertices for 20,000 model-specific three-dimensional items. While digital items 102-102m are depicted as being uniform, some digital items may lack data for different character models. For example, a particular helmet may be fit to only a subset of the character models, either by design or because a fit to other character models has not been performed.

Containerized environment 110 comprises a computer system, such as a server computer, that hosts one or more container environments, such as Docker or Kubernetes containers. The container environment may comprise a stand-alone executable software package that provides particular services and includes everything need to run the software package, including code, runtime, system libraries, settings, etc. The container environments may implement a Container Network Interface (CNI) networking model or a Container Network Model (CNM) adopted by popular container orchestrators to perform local programming. While FIG. 1 depicts the model training being performed in a containerized environment 110 to provide a clear example, other embodiments may include physical computing devices training the model. Additionally, other computing devices described in FIG. 1 may be implemented through a containerized environment in other embodiments.

In an embodiment, containerized environment 110 comprises vertex matching instructions 112. Vertex matching instructions 112 comprise computer-readable instructions which, when executed, cause a computing system hosting containerized environment 110 to perform the vertex matching methods described further herein. While vertex matching instructions 112 are depicted as being stored and executed in containerized environment 110, in other embodiments the vertex matching methods may be performed in a different computing device and containerized environment 110 may receive the outputs of the vertex matching, such as training datasets with matched vertices.

Machine learning generation and training instructions 114 comprise computer-readable instructions which, when executed, cause a computing system hosting containerized environment 110 to initialize and/or train one or more machine learning models. Machine learning generation and training instructions 114 may define one or more of a type of model to be initialized, parameters for the model, equations for the model, input types for the model, output types for the model, and/or instructions for training the model using training datasets as described herein. For example, the machine learning generation and training instructions 114 may define a regression model according to a particular linear equation which is configured to compute a shape and size of three-dimensional digital objects to fit a first character model based on the shape and size that the same three-dimensional digital objects have to fit a second character model.

Server computer 120 may be implemented using a server-class computer or other computers having one or more processor cores, co-processors, or other computers. Server computer 120 may be a physical server computer and/or a virtual server instance stored in a data center, such as through cloud computing. Server computer 120 may store trained machine learning systems 122a-122n and graphical user interface instructions 124. Server computer 120 may be configured to receive input data from a client computing device 130, use one or more trained machine learning systems to compute one or more outputs, and provide the one or more outputs to the client computing device 130.

Trained machine learning systems 122a-122x comprise machine learning systems configured to compute a shape and size of model-specific three-dimensional digital objects to fit a second character model based on the shape and size that the same three-dimensional digital objects have to fit a first character model. Server computer 120 may receive the trained machine learning systems 122a-122x from the containerized environment 110.

The number of machine learning systems (x) may correspond to a number of character models (n) for which vertex information is stored for the digital items stored in digital item datastore 100. For example, in an embodiment where the machine learning systems all translate from a particular base character model (e.g. a male human model) as inputs to different character models (e.g. elves, pandarans, etc.) as outputs, the number of machine learning systems may comprise x=n−1, as there would be a machine learning system for each character model except the base character model. As another example, in embodiments where any character model can be used as a base character model, the number of machine learning systems may be x=n(n−1). For instance, the first described example may allow computation of shapes and sizes of different model-specific versions of a digital item that is originally fit to a male human while the second described example may allow computation of shapes and sizes of different model-specific versions of a digital item regardless of the character model to which it is originally fit.

Graphical user interface instructions 124 comprise computer readable instructions which, when executed by the server computer 120 cause the server computer to generate and cause display, through a graphical user interface on client computing device 130, output digital items. The output digital items may be displayed with character models to which they are fit. For example, a helmet fit to a female goblin character may be displayed being worn by a female goblin character model. The graphical user interface may be generated by the server computer 120 and/or by the client computing device 130.

The client computing device 130 is a computer that includes hardware capable of communicatively coupling the device to one or more server computer, such as server computer 120, over one or more service provides. For example, client computing device 130 may include a network card that communicates with server computer 120 through a home or office wireless router (not illustrated in FIG. 1) coupled to an internet service provider. The client computing device 130 may be a smart phone, personal computer, tabled computing device, PDA, laptop, or any other computing device capable of transmitting and receiving information and performing the functions described herein.

For purposes of illustrating a clear example, FIG. 1 shows a limited number of instances of certain functional elements. However, in other embodiments, there may be any number of such elements. For example, server computer 120 may receive requests from any number of client computing devices 130. Further, the server computer 120 may be implemented using two or more processor cores, clusters, or instances of physical machines or virtual machines, configured in a discreet location or co-located with other elements in a datacenter, share computing facility, or cloud computing facility. In other embodiments, one or more of the elements depicted herein may be combined. For example, a client computing device may store the trained machine learning systems. As another example, a same server computer may perform the training of the machine learning system and the computation of outputs using the trained machine learning system.

Functional Overview

Figure 2:
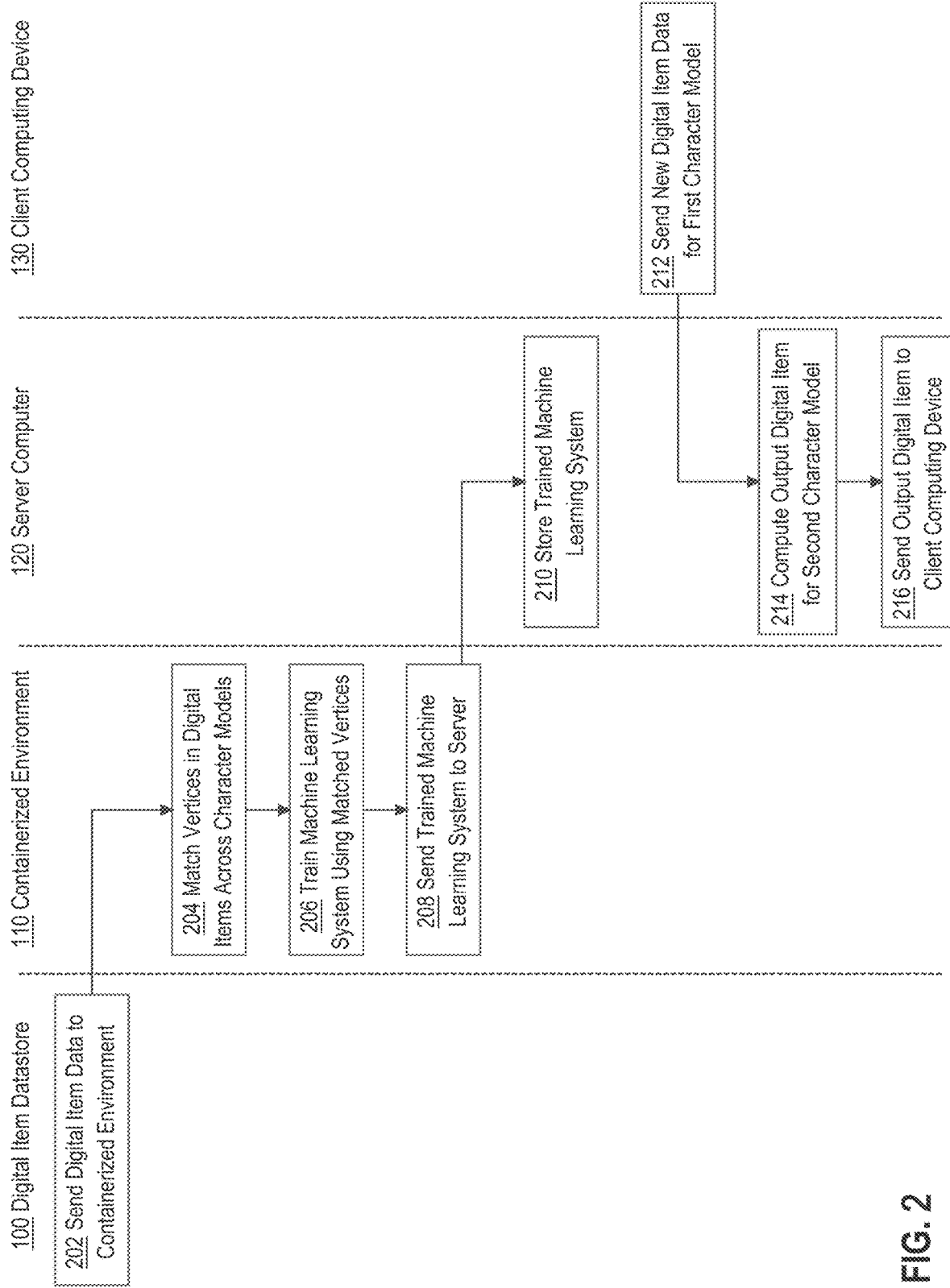
FIG. 2 depicts an example method of training and utilizing a machine learning system configured to compute a shape and size of three-dimensional digital objects to fit a second character model based on the shape and size that the same three-dimensional digital objects have to fit a first character model.

FIG. 2 depicts an example method of training and utilizing a machine learning system configured to compute a shape and size of a model-specific digital object for a second character model (e.g. a spiked helm for a female dwarf) based on the shape and size of a model-specific digital object, for the same digital object, fit to a first character model (e.g. a spiked helm for a male human).

At step 202, digital item data is sent from digital item data store 100 to containerized environment 110. For example, digital item data store 100 may store data defining a plurality of digital items, each of which fit to a plurality of different character models, including a first character model and a second character model. The digital item data store 100 may send the data defining the plurality of digital items to the containerized environment 110. Additionally or alternatively, the data sent to containerized environment 110 may comprise a subset of the stored data the defines a shape and size of model-specific versions of the digital items. For example, the digital item data store 100 may send data defining vertices of the digital items when fit to different character models, but not additional information, such as textures, colors, or physical properties.

At step 204, vertices of digital items are matched across character models in containerized environment 110. For example, the containerized environment may identify, for each vertex of a digital item fit to a first character model, a corresponding vertex of the digital item fit to the second character model. In embodiments where vertices have been previously matched between character models and/or where vertices are matched manually using different methods, this step may be skipped. Otherwise, methods for performing the matching between digital items fit to different character models are described further herein.

In an embodiment, the containerized environment 110 is configured to match vertices from digital items fit to a particular base character model to digital items fit to each other (non-base) character model. For example, if the base character model is a male human model, the containerized environment 110 may be configured to match vertices from the digital item fit to the male human model to versions of the digital item fit to each other character model. In other embodiments, the containerized environment 110 matches vertices for each model-specific digital item across multiple different model-specific character models. Thus, instead of matchings from a same base character model, the containerized environment 110 may match model-specific digital items amongst each combination of character models.

At step 206, a machine learning system is trained in containerized environment 110 using the matched vertices. For example, the containerized environment 110 may generate training datasets for one or more different machine learning systems from the matched vertex data. The training data may include, for each digital item, an input matrix and an output matrix. The input matrix may comprise coordinates for each vertex of a human-male-specific version of a digital item and the output matrix may comprise coordinates for each corresponding vertex of the female-dwarf-specific version of the same digital item. The locations of vertices in the input matrix may correspond to the locations of matched vertices in the output matrix. Thus, the first set of coordinates in the input matrix may be coordinates that were matched to the first set of coordinates in the output matrix in step 204.

In an embodiment, the machine learning system comprises a linear regression or neural network model configured to compute an output matrix of vertices from an input matrix of vertices. Containerized environment 110 may be configured to initialize a single machine learning system that matches between two different character models and/or a plurality of machine learning systems where each machine learning system matches between two different character models. Thus, a first machine learning system may be configured to compute a size and shape of model-specific versions of digital items fit to a female pandaren from data defining a size and shape of model-specific versions of digital items fit to a male human, while a second machine learning system is configured to compute a size and shape of model-specific versions of digital items fit to a male goblin from data defining a size and shape of model-specific versions of digital items fit to the male human. Embodiments may include machine learning systems trained with reversed inputs and outputs, such that one may compute a size and shape of digital items fit to a female pandaren from data defining a size and shape of digital items fit to a male human while a second computes a size and shape of digital items fit to a male human from data defining a size and shape of digital items fit to a female pandaren. Embodiments may also include machine learning systems with different combinations of models, such as female pandaren to male goblin.

In an embodiment, different machine learning systems may be initialized and trained for different categories of digital items. For example, a first set of machine learning systems may be initialized and trained for computing model-specific sizes and shapes of helmets from data defining a model-specific size and shape of an input helmet while a second set of machine learning systems may be trained to generate model-specific sizes and shapes of shoulder armor from data defining a model-specific size and shape of an input shoulder armor.

Machine learning systems for computing a shape and size of three-dimensional digital objects to fit a second character model based on the shape and size that the same three-dimensional digital objects have to fit a first character model are described further herein. Containerized environment 110 may utilize the methods described herein to initialize the one or more machine learning systems and individually train the machine learning systems using the data retrieved from digital item data store 100. In other embodiments, a plurality of containerized environments is used with each trained machine learning systems for different combinations of character models. Thus, a plurality of machine learning models may be trained in parallel based on different training datasets. The use of a plurality of containerized environments additionally allows a smaller subset of data to be sent to different containerized environments and for the different environments to perform the matching in parallel. For instance, if each digital item is fit to twenty different character models, an individual containerized environment may only require data defining the digital item when fit to two character models, the input character model and the output character model.

At step 208, a trained machine learning system is sent from containerized environment 110 to server computer 120. For example, the containerized environment 110 may be configured to send trained machine learning systems to the server computer 120. The server computer 120 may use the trained machine learning systems to compute outputs. By offloading the generation and training of the machine learning systems, the server computer 120 is able to provide the functionality of the machine learning systems without the resource expenditure or high storage costs of obtaining all of the input data and training each machine learning system used. At step 210, server computer 120 stores the trained machine learning system. For example, the server computer 120 may store the trained machine learning system or systems in memory until a request is received to produce a new output using the stored machine learning system or systems.

At step 212, a client computing device 130 sends new digital item data for a first character model to server computer 120. For example, the server computer 120 may provide a graphical user interface through which a client computing device 130 may upload data defining a new digital item that is fit to a first character model. The data defining the new digital item may comprise data defining the location of the vertices of the new digital item and data defining which vertices are connected. The data may additionally include data that identifies the character model to which the new digital item is fit. For example, if the new digital item was originally designed as being fit to a female orc, the client computing device 130 may send, along with the data defining vertices of the new digital item, an indication that the item was fit to a female orc, thereby allowing the server computer 120 to select the correct machine learning systems for computing outputs.

At step 214, the server computer 120 computes an output digital item for a second character model. For example, the server computer 120 may generate an input data set comprising coordinates of each vertex of the new digital item. The server computer 120 may then feed the input data set into the machine learning system to compute an output data set comprising coordinates of each vertex of the new digital item fit to the second character model. The server computer 120 may then use data defining which vertices are connected for the new digital item to connect the vertices of the output data set, thereby generating the output model-specific digital item. For example, if the first and fourth vertex of the new digital item fit to the first character model were connected, then the server computer may determine that the first and fourth vertex of the new digital item fit to the second character model should be connected. In this manner, a full model is rebuilt from vertex coordinates.

At step 216, the server computer sends the output digital item to the client computing device 130. For example, the server computer may cause display of the output digital item on the client computing device 130 through a graphical user interface. The display may additionally include the second character model to which the digital item is fit. Thus, if a helmet fit to a male human was fit to a female goblin, the server computer may display the helmet being worn by the female goblin character model. In an embodiment, the server computer computes outputs for each of a plurality of different character models and causes display of each output on the client computing device 130. For example, if the server computer stores machine learning systems for each of a plurality of output character models, the server computer may compute outputs with each of the plurality of machine learning systems and cause display of each output with its corresponding character model.

Vertex Matching

Figure 3:
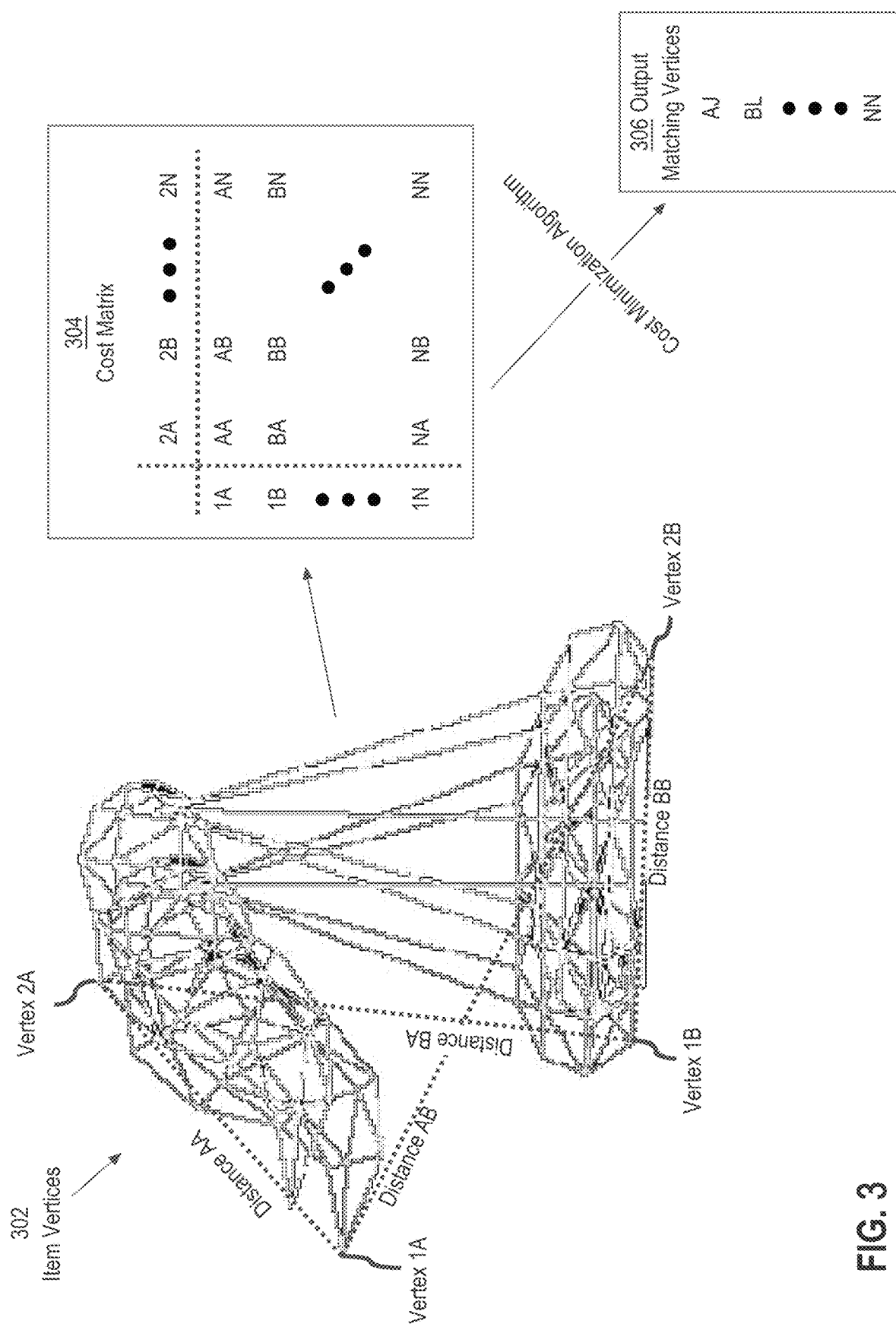
FIG. 3 depicts an example method for performing vertex matching for digital items scaled to different character models.

FIG. 3 depicts an example method for performing vertex matching for digital items scaled to different character models. The example of FIG. 3 may be performed for a plurality of combinations of character models for a same digital item. For example, a first matching of vertices may be performed between a male human model and a female goblin model while a second matching of vertices may be performed between the male human model and a male pandaren model. Multiple sets of matched vertices may be used to produce new matchings between models without performing the method of FIG. 3. For example, with the two aforementioned matchings, the system may generate a matching of vertices between the male pandaren model and the female goblin model by matching vertices from the male pandaren model and the female goblin model that match to the same vertices in the male human model.

Item vertices 302 comprise a visual representation of vertices of two versions of a same digital item fit to different character models. The vertices may be extracted from data defining the digital item, such as from a mesh that serves as the backbone for the digital item. While item vertices 302 are depicted as three-dimensional visual representations, in embodiments item vertices 302 may be defined by a set of coordinates in three-dimensional space and by the vertices to which they connect. For example, vertex 1A may be defined as a set of (u, v) texture coordinates and data identifying the three vertices to which vertex 1A connects. While examples are discussed with respect to texture coordinates, any set of coordinates in three-dimensional space may be used, such as spherical coordinates or Euclidean coordinates.

Vertex 1A and vertex 1B comprise two vertices of model 1, where model 1 comprises a model of the digital item fit to a first character model. Vertex 2A and vertex 2B comprise two vertices of model 2, where model 2 comprises a model of the digital item fit to a second character model. In an embodiment, vertices are randomly or pseudo-randomly sampled in each model. Thus, vertex 1A and vertex 2A comprise vertices in different locations of the models. In an embodiment, the system samples vertices until each vertex of the digital item has been identified in each model.

Once the system has identified the vertices, the system computes distances between each set of vertices. Distance AA comprises the distance between vertex 1A and vertex 2A. Similarly, distance BB comprises the distance between vertex 1B and vertex 2B, distance, AB comprises the distance between vertex 1A and vertex 2B, and distance BA comprises the distance between vertex 1B and vertex 2A. While FIG. 3 depicts only two vertices on each of the digital items, in an embodiment, the system computes distances between each vertex of the digital item fit to the first character model and each vertex of the digital item fit to the second character model.

Using the distances between vertices of the digital items, the system generates cost matrix 304. Cost matrix 304 comprises a matrix of distances between vertices of model 1, as represented by the rows of cost matrix 304, and vertices of model 2, as represented by the columns of cost matrix 304.

After generating the cost matrix 304, the system may use a cost minimization algorithm to identify vertex matches which, in aggregate, minimize a total cost (or distance) between matched vertices. For example, the system may use a Kuhn-Munkres algorithm or any other combinatorial optimization algorithm to permutate rows and columns of the cost matrix to minimize the trace of the matrix.

Output matching vertices 306 comprise the outputs of using the cost minimization algorithm on the cost matrix 304. The outputs comprise identifiers of vertices that were matched between the models. For example, vertex A of model 1 was matched to vertex J of model 2, vertex B of model 1 was matched to vertex L of model 2, and, coincidentally, vertex N of model 1 was matched to vertex N of model 2.

Matched vertices may be used to generate training datasets as inputs and corresponding outputs. For example, output matching vertices 306 of FIG. 3 may be separated into two columns, a column corresponding to the vertices of model 1 and a column corresponding to the matched vertices of model 2, wherein a vertex in a particular row of one column was matched to a vertex in the particular row of the other column. Thus, the input column generated from output matching vertices 306 may comprise a column of (A, B, N) while the output column comprises a column of (J, L, N), where each vertex letter is replaced by the vertex's coordinates.

In some situations, a version of a digital item fit to a first character model may have a different number of vertices than a version of the digital item fit to a second character model. In an embodiment, the cost matrix is supplemented with additional rows or columns comprising high distance values to generate a square cost matrix. Thus, when the cost minimization algorithm is performed, the vertices that are matched to the high distance values are discarded and not used to generate the training datasets.

Machine Learning System Training

In an embodiment, the system uses the coordinates matched using the method of FIG. 3 to train a machine learning system. Additionally or alternatively, the system may receive data identifying matching coordinates, such as coordinates that were identified as matching when the digital items were originally created or coordinates that were manually matched by one or more designers.

In an embodiment, the system initializes a regression model and trains the regression model using training input data for a plurality of items. The training input data comprises for each item, input vertex coordinates of the item when fit to the first character model and matching output vertex coordinates of the item when fit to the second character model. Thus, for a particular model, each set of inputs may correspond to a same character model, such as the male human character model, while each set of outputs corresponds to a particular other character model, such as the female goblin character model. A regression model may be defined as:

$$\hat{y}=f(x;w)$$

where $\hat{y}$ is the predicted output vertices and $f(x; w)$ is a differentiable function of the input vertices, $x$, and a set of weights, $w$, which are trained using the training datasets.

In an embodiment, the function used for the regression model comprises a function that models different types of transformations and an affinity between a particular vertex and the transformation. The transformations may include any of shear, rotation, scale, translation, or any other three-dimensional transformations. The affinity comprises a weight of the transformation that is dependent on the input coordinates. For example, vertices for helmets will comprise vertices that correspond to parts of the helmet that are closer to the character model's head and parts of the helmet that are further from the character model's head. The vertices closer to the character model's head may be more sensitive to some types of transformations, such as translation, but less sensitive to other types of transformations, such as scale. Thus, the affinity value takes into account an affinity of a vertex to a type of transformation by basing the affinity value, at least in part on the location of the vertex.

As a practical example, the regression model may be initialized according to:

$$\hat{y}_i = \sum_k T_k * A_{k,x_i} * x_i$$

where $\hat{y}_i$ is a particular output vertex value, $T_k$ is one of k transformation matrices, $A_{k,x_i}$ is the affinity value which is dependent on the transformation type k and the coordinates of the input vertex $x_i$. In an embodiment, the transformation matrices comprise (3×4) matrices defining one or more of translation, shear, rotation, or scaling, using known mathematical methods for defining coordinate transformations.

The affinity weight value may be generated using an embedding computed for each of the vertices. For example, PointNet is an existing deep learning network which maps a set of three dimensional coordinates into 1024 dimension space where points nearby in the embedding have similar semantic properties. The system may generate an initial embedding for the vertices and a separate embedding for each transformation, thereby creating K+1 embeddings where K is the number of transformation matrices. The affinity weight value may then be computed as:

$$A_{k,x_i}(x;w) = \text{softmax}([e_a(x_i,x;w)*e_l(x_l,x;w) \forall l]_k)$$

where $e_a$ is the initial embedding and $e_l$ is the embedding for the transformation.

In an embodiment, the transformation matrices and affinity matrices are parameterized with weights using a machine learning system, such as a deep neural network which uses each full set of coordinates as inputs. Thus, the above regression model may be rewritten as:

$$\hat{y}_i \sum_k T_k(x;w) * A_{k,x_i}(x;w) * x_i$$

to indicate that $T_k$ and $A_{k,x_i}$ are both parameterized according to sets of input vertices x and weights w. An example deep learning network which can be used to parameterize the transformation matrices and affinity values is the PointNet which is commercially available on online repositories, such as GitHub. A different PointNet may be used for each transformation and for the computing affinities.

While many machine learning systems perform predictions for which there are definite outcomes, the models described herein are configured to provide outcomes which comprise a level of subjectivity. The training datasets may include digital items that were fit differently to a single character model based on differences in taste, effort, or skill.

For example, a first designer may scale horns of a helmet based on a height of the character model's head while a second designer may scale horns of the helmet based on a length of the character model's head.

In an embodiment, the system defines a plurality of different regression models which are used in both the training step and the model usage step. The plurality of different regression models may be used to capture different types of fitting of digital items from one character model to a second character model. Given j regression models, the above equation may be rewritten as:

$$\hat{y}_{i,j} \sum_k T_{k,j}(x;w) * A_{k,j,x_i}(x;w) * x_i$$

thereby predicting j outcomes based on models parameterized to different weights. During the training phase, results from the plurality of models may be used as part of the training information. Thus, instead of using the standard regression loss in gradient descent, the system may compute the regression loss as:

$$\min_j |\hat{y}_{i,j} - y_i|$$

such that only the closest prediction is used to fit the models. Each model may be initialized with different starting weights, thereby allowing the training step to converge the models differently. During the updating step of the training phase, the model that generated the closest prediction may be updated.

Embodiments of the model described above generate a one-to-one prediction of vertices for an output three-dimensional digital item fit to a second character model from vertices of an input three-dimensional digital item fit to a first character model. Thus, if multiple transformations are desired, such as in a case where a single item may need to be fit to a plurality of different character models, the system may initialize a plurality of machine learning systems and train the plurality of machine learning systems with different inputs or outputs. Thus, a first machine learning system may be initialized and trained using digital items fit to a male human as inputs and digital items fit to female goblins as outputs while a second machine learning system is initialized and trained using digital items fit to a male human as inputs and digital items fit to a male pandaren as outputs. Different machine learning systems may additionally be initialized and trained for different types of items. For example, a first model may correspond to helmets while a second model corresponds to chest armor. The models may be initialized and trained in a single containerized environment and/or may be initialized and trained in parallel in a plurality of containerized environments.

Model Usage

The machine learning systems described above may be used to generate different versions of a three-dimensional digital item fit to different character models. For instance, a designer may generate a new three-dimensional digital item fit to a specific character model, such as a helmet fit to a male human character model. The designer may use a client computing device to send a request to a server computer to generate one or more different versions of the new three-dimensional digital item fit to different character models. In an embodiment, the client computing device specifies a character model to which the new three-dimensional digital item was initially fit and/or identifies one or more character models to which the new three-dimensional digital item is to be fit. The client computing device may send the new three-dimensional digital item to the server computer and/or data defining the vertices of the new three-dimensional digital item.

When the server computer receives the request, the server computer may identify one or more machine learning systems to use to satisfy the request. For example, the server computer may identify machine learning systems trained with inputs corresponding to a same character model as the new three-dimensional digital item and outputs corresponding to a requested output character model. Thus, if the request identifies the input as a male human and the outputs as female goblin and male pandaren, the server computer may identify a male human to female goblin model and a male human to male pandaren model. In an embodiment, the outputs are computed in parallel by multiple processes or multiple server computers. In an embodiment, the server computer automatically identifies each machine learning system which uses as the input digital items fit to the character model to which the new three-dimensional digital item is fit.

After the model has been identified, the server computer may use the vertex data for the new three-dimensional digital object to compute vertices for output three-dimensional digital objects fit to the one or more character models. In an embodiment, the server computer additionally recreates a digital mesh using the vertices. For example, the server computer may receive data identifying connections between vertices. When the new locations for the vertices are computed for a particular output digital object, the server computer may rebuild the connections between the vertices based on the received data. Thus, if vertex A was connected to vertex J, the server computer may connect vertex A' to vertex J'.

In embodiments that use the plurality of regression models for a single machine learning system, the server computer may compute a plurality of results and provide the plurality of results to the client computing device. For example, using the machine learning model defined by:

$$\hat{y}_{i,j} \sum_k T_{k,j}(x; w) * A_{k,j,x_i}(x; w) * x_i$$

a machine learning system computes j output sets of vertices. The server computer may generate a version of the new digital item according to each of the output sets of vertices. Thus, if j=4, the server computer may generate four different versions of the new three-dimensional digital object fit to a particular character.

Figure 4:
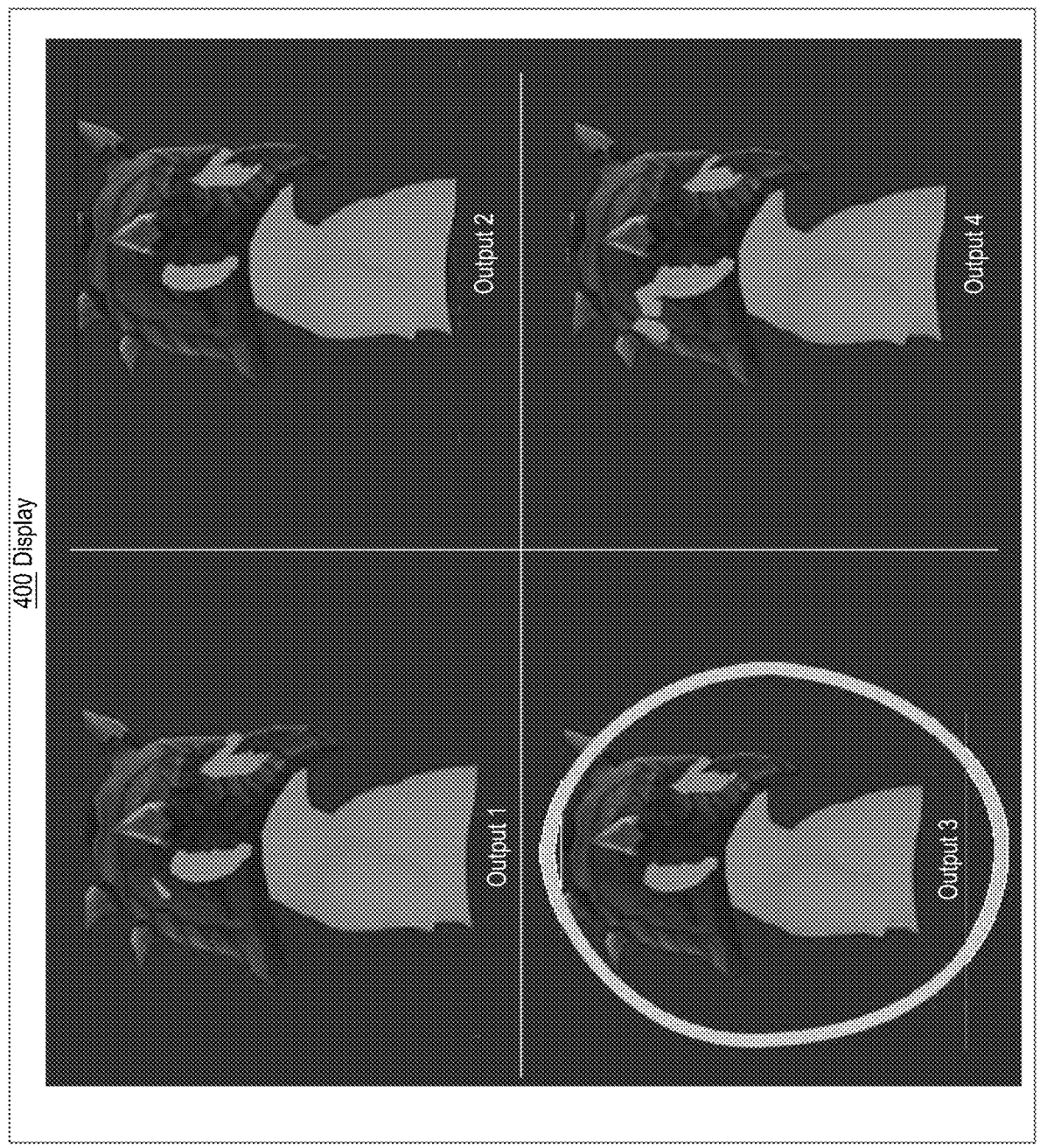
FIG. 4 depicts an example interface presenting a character model combined with an output three-dimensional digital item.

In an embodiment, the server computer provides, to the client computing device, a graphical user interface in which the plurality of output digital items is depicted with a corresponding character model. For example, if the machine learning system computed four output sets of vertices for a digital item fit to a female goblin character model, the server computer may display four versions of the female goblin character model wearing versions of the digital item corresponding to the four output sets of vertices. FIG. 4 depicts an example interface presenting a character model combined with an output three-dimensional digital item.

Display 400 comprises a graphical user interface being displayed on a client computing device. Display 400 comprises four outputs, output 1, output 2, output 3, and output 4, generated using the systems and methods described herein. Each of the four outputs comprise a same character model combined with a different output three-dimensional digital item. Given variances in the machine learning models, the outputs have slight variations. For instance, output 1 and output 4 show clipping of the character model's head through the helmet. By displaying a plurality of outcomes generated using the plurality of different machine learning systems, the server computer is able to account for stylistic differences and poor quality translations in the training data, thereby allowing a person to make a final decision as to a best version of the digital item fit to the character model.

In an embodiment, the server computer executes one or more post-processing rules to remove outputs that meet particular criteria. For example, the server computer may determine whether portions of the character model overlap with portions of the digital item, thereby causing the clipping depicted in outputs 1 and 4. If the server computer identifies clipping in an output, the server computer may remove the output from those provided to the client computing device. Thus, in an embodiment, the server computer may display only outputs 2 and 3 of FIG. 4 to the client computing device. Thus, the server computer may generate a larger number of outputs, but display only the outputs that meet particular criteria, thereby improving the visual interface provided to the client computing device.

Embodiments described above may be implemented when a new digital item is created and fit to an existing character model. Similarly, embodiments may be implemented when a new character model is created and fit to a plurality of digital items. For example, when a designer generates a new character model, a large number of existing stored digital items may need to be fit to the new character model.

In an embodiment, the methods described herein may be used to initialize and train a new machine learning system for a new character model. The client computing device may initially send a request to the server computer for a new machine learning system. The request may include a new character model and a plurality of three-dimensional digital items from the digital item datastore that are fit to the new character model. Additionally or alternatively, the new character model and/or the plurality of three-dimensional digital items fit to the new character model may be stored in the digital item datastore and the client computing device may identify the stored data to the server computer.

For each three-dimensional digital item fit to the new character model, the system may identify a corresponding version of the three-dimensional digital item fit to an existing character model. Data identifying vertices for the three-dimensional digital items fit to the new character model and to the existing character model may be sent to the containerized environment. The containerized environment may train the machine learning system using the received data and send the resulting machine learning system to the server computer. The server computer may then request, from the digital item datastore, data for digital items that were not initially fit to the new character model. The server computer may use the machine learning system to compute outputs for the received data, thereby fitting a plurality of existing items to the new character model.

As a practical example, one or more designers may generate a humanoid rat creature as a new character model for a game. The one or more designers may further manually fit a plurality of existing helmets to the humanoid rat creature through manual manipulation of the stored helmets.

In an embodiment, the server computer may require a minimum number of items to be fit to the new character model, such as 100 items, prior to generating and training the machine learning system. The designer may then send a request, through the client computing device, for the server computer to fit the remaining helmets to the humanoid rat creature, using data defining vertices of the existing helmets that have been modified to fit the humanoid rat creature. The server computer may then request that the containerized environment initialize and train a machine learning model using data defining vertices of the existing helmets fit to a male human character model as inputs and the data defining vertices of the existing helmets fit to the humanoid rat creature as outputs. After the machine learning system has been initialized and trained, the server computer may request and receive data defining a remainder of the existing helmets fit to the male human character from the digital item datastore and use the data as inputs into the machine learning system to compute output helmets fit to the humanoid rat creature.

The systems and methods described herein may additionally be used to improve existing items fit to character models. For example, the server computer may identify a plurality of digital items fit to a particular character model for improvement. The server computer may identify the digital items based on user input identifying the digital items, based on determining that the digital items meet one or more criteria, such as overlapping with a character models, and/or based on metadata associated with the item, such as a date of creation. The server computer may use a version of the item fit to a different character model as input and compute a new output for the item. The server computer may then replace the existing item with the newly generated item. For example, if a helmet was poorly fit to a female orc, the server computer may use a version of the helmet fit to a male human as input and compute an output helmet fit to the female orc using a machine learning system trained with helmets fit to the male human as inputs and helmets fit to the female orc as outputs. The server computer may send the output to a client computing device for confirmation and/or may send the output to the digital item datastore to replace the existing version fit to the female orc.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for ML model 1316 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. A supervised or unsupervised ANN model may be elevated as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
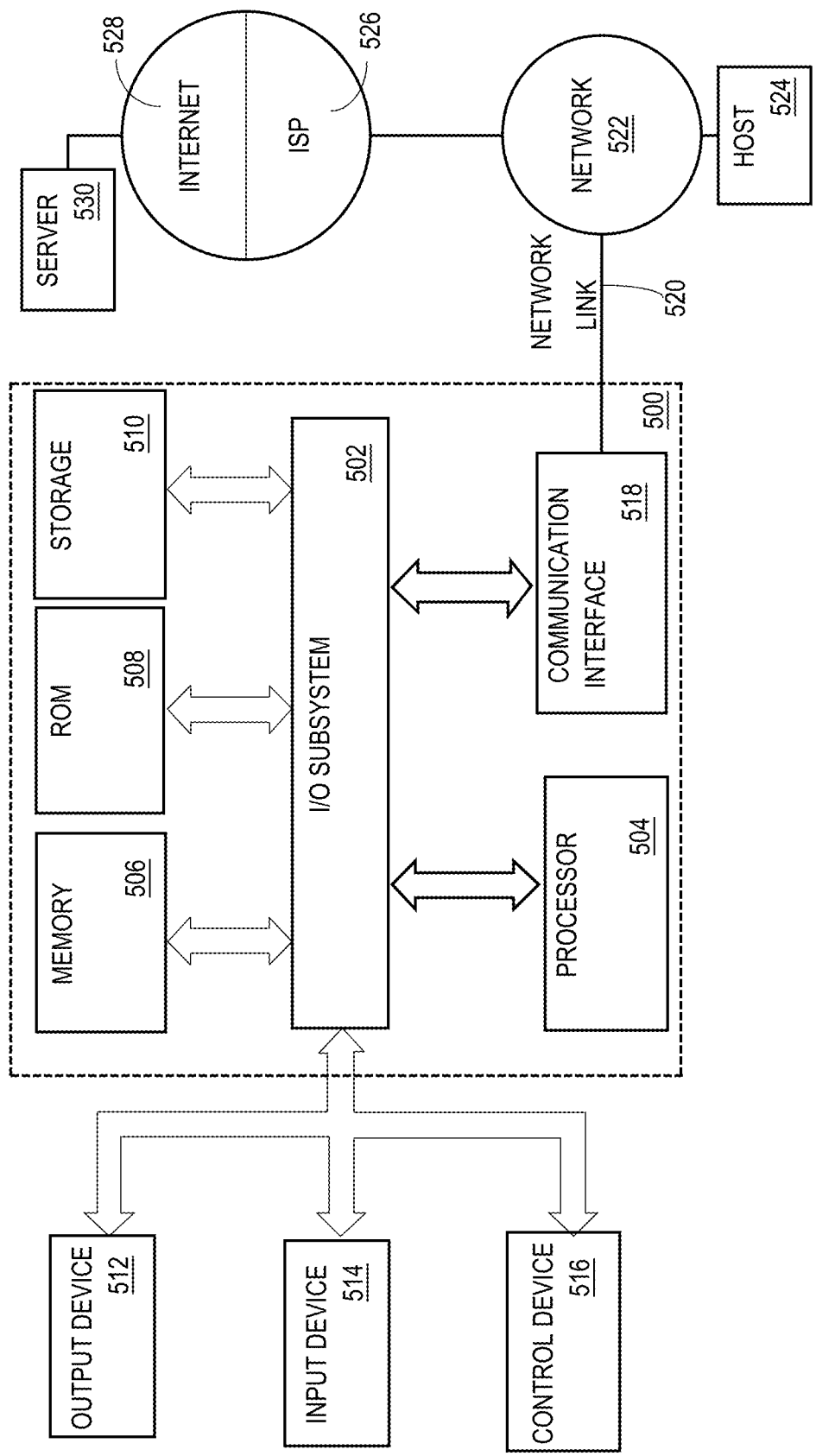
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   storing, at a server computer, a machine learning system configured to compute a shape and size of three-dimensional digital objects to fit a second character model based on the shape and size that the same three-dimensional digital objects have to fit a first character model;
   receiving, from a client computing device, particular input data defining a plurality of particular input vertices for a particular input three-dimensional digital object fit for the first character model;
   in response to receiving the particular input data, computing, using the machine learning system, particular output data defining a plurality of particular output vertices for a particular output three-dimensional digital object;
   wherein the particular output three-dimensional digital object is the particular input three-dimensional digital object fit for the second character model; and
   causing display, on the client computing device, of the particular output three-dimensional digital object combined with the second character model.

2. The method of claim 1, further comprising:
   storing, in a data repository, data defining a plurality of three-dimensional digital objects, each of which fit to a plurality of character models;
   generating machine learning training data by, for each of the plurality of three-dimensional digital objects, matching a plurality of vertices of the three-dimensional digital object fit to the first character model to vertices of the three-dimensional digital object fit to second character model; and
   training the machine learning system using the machine learning training data.

3. The method of claim 2, wherein training the machine learning system is performed in a containerized environment separate from the server computer.

4. The method of claim 2, wherein matching the plurality of vertices comprises:
   for each vertex of the three-dimensional digital object fit to the first character model, computing a plurality of vertex distances, each of which comprising a distance from the vertex to a vertex of the three dimensional digital object fit to the second character model;
   generating a matrix which identifies the vertex distances for each vertex of the three-dimensional digital object fit to the first character model; and
   using an optimization algorithm, computing, for each vertex of the first character model, a corresponding vertex of the second character model such that a total of distances between all vertices and corresponding vertices are minimized.

5. The method of claim 2, wherein the machine learning system comprises a plurality of transformation matrices defining different types of transformations and, for each transformation matrix, an affinity matrix defining an affinity of a data point to the different types of transformations.

6. The method of claim 2, wherein:
   the machine learning system comprises a plurality of regression models with different weights;
   the machine learning system computes a plurality of predictions; and
   a regression loss value used to train the machine learning system through gradient descent is computed as a minimum of regression loss values computed from the plurality of predictions.

7. The method of claim 6, wherein:
   the particular output three-dimensional digital object comprises a plurality of versions of the output three-dimensional digital object, each of which computed using a different regression model of the plurality of regression models of the machine learning system;
   causing display of the particular output three-dimensional digital object combined with a particular character model comprises causing display of the plurality of versions of the output three-dimensional digital object;
   the method further comprises receiving input from the client computing device selecting a particular version of the output three-dimensional digital object and, in response, storing the particular version of the output three-dimensional digital object.

8. The method of claim 1, further comprising:
   storing, at the server computer, a second machine learning system configured to compute a shape and size of three-dimensional digital object to fit a third character models based on the shape and size that the same three-dimensional digital object have to fit the second character models;
   further in response to receiving the particular input data, computing, using the second machine learning system, second output data defining a plurality of second output vertices for a second output three-dimensional digital object;
   causing display, on the client computing device, of the second output three-dimensional digital object combined with the third character model.

9. The method of claim 1, further comprising:
   receiving new character model data defining a new character model;
   receiving new three-dimensional digital object data comprising a plurality of three-dimensional digital objects fit to the new character model;
   using stored data defining the plurality of three-dimensional digital objects fit to the first character model and the new three-dimensional digital object data, training a new machine learning system to compute a shape and size of three-dimensional digital object to fit to the new character model based on the shape and size that the same three-dimensional digital object have to fit the second character models;
identifying a plurality of stored three-dimensional digital objects that do not correspond to the plurality of three-dimensional digital objects fit to the new character model; and
using the new machine learning system, computing outputs for each of the stored three-dimensional digital objects.

10. A system comprising:
one or more processors;
a memory storing instructions which, when executed by the one or more processors, cause performance of:
storing a machine learning system configured to compute a shape and size of three-dimensional digital objects to fit a second character model based on the shape and size that the same three-dimensional digital objects have to fit a first character model;
receiving, from a client computing device, particular input data defining a plurality of particular input vertices for a particular input three-dimensional digital object fit for the first character model;
in response to receiving the particular input data, computing, using the machine learning system, particular output data defining a plurality of particular output vertices for a particular output three-dimensional digital object;
wherein the particular output three-dimensional digital object is the particular input three-dimensional digital object fit for the second character model; and
causing display, on the client computing device, of the particular output three-dimensional digital object combined with of the second character model.

11. The system of claim 10, wherein the instructions, when executed by the one or more processors, further cause performance of:
accessing stored data defining a plurality of three-dimensional digital objects, each of which fit to a plurality of character models;
generating machine learning training data by, for each of the plurality of three-dimensional digital objects, matching a plurality of vertices of the three-dimensional digital object fit to the first character model to vertices of the three-dimensional digital object fit to second character model; and
training the machine learning system using the machine learning training data.

12. The system of claim 11, wherein training the machine learning system is performed in a containerized environment.

13. The system of claim 11, wherein matching the plurality of vertices comprises:
for each vertex of the three-dimensional digital object fit to the first character model, computing a plurality of vertex distances, each of which comprising a distance from the vertex to a vertex of the three dimensional digital object fit to the second character model;
generating a matrix which identifies the vertex distances for each vertex of the three-dimensional digital object fit to the first character model; and
using an optimization algorithm, computing, for each vertex of the first character model, a corresponding vertex of the second character model such that a total of distances between all vertices and corresponding vertices are minimized.

14. The system of claim 11, wherein the machine learning system comprises a plurality of transformation matrices defining different types of transformations and, for each transformation matrix, an affinity matrix defining an affinity of a data point to the different types of transformations.

15. The system of claim 11, wherein:
the machine learning system comprises a plurality of regression models with different weights;
the machine learning system computes a plurality of predictions; and
a regression loss value used to train the machine learning system through gradient descent is computed as a minimum of regression loss values computed from the plurality of predictions.

16. The system of claim 15, wherein:
the particular output three-dimensional digital object comprises a plurality of versions of the output three-dimensional digital object, each of which computed using a different regression model of the plurality of regression models of the machine learning system;
causing display of the particular output three-dimensional digital object combined with a particular character model comprises causing display of the plurality of versions of the output three-dimensional digital object;
the instructions, when executed by the one or more processors, further cause performance of receiving input from the client computing device selecting a particular version of the output three-dimensional digital object and, in response, storing the particular version of the output three-dimensional digital object.

17. The system of claim 10, wherein the instructions, when executed by the one or more processors, further cause performance of:
storing a second machine learning system configured to compute a shape and size of three-dimensional digital object to fit a third character models based on the shape and size that the same three-dimensional digital object have to fit the second character models;
further in response to receiving the particular input data, computing, using the second machine learning system, second output data defining a plurality of second output vertices for a second output three-dimensional digital object;
causing display, on the client computing device, of the second output three-dimensional digital object combined with the third character model.

18. The system of claim 10, wherein the instructions, when executed by the one or more processors, further cause performance of:
receiving new character model data defining a new character model;
receiving new three-dimensional digital object data comprising a plurality of three-dimensional digital objects fit to the new character model;
using stored data defining the plurality of three-dimensional digital objects fit to the first character model and the new three-dimensional digital object data, training a new machine learning system to compute a shape and size of three-dimensional digital object to fit to the new character model based on the shape and size that the same three-dimensional digital object have to fit the second character models;
identifying a plurality of stored three-dimensional digital objects that do not correspond to the plurality of three-dimensional digital objects fit to the new character model; and using the new machine learning system, computing outputs for each of the stored three-dimensional digital objects.

\* \* \* \* \*